United States Patent
Park

(10) Patent No.: US 12,197,847 B2
(45) Date of Patent: Jan. 14, 2025

(54) METHOD FOR PROVIDING ELECTRIC DOCUMENT USING CHATBOT, APPARATUS AND METHOD FOR WRITING ELECTRIC DOCUMENT USING CHATBOT

(71) Applicant: FORCS CO., LTD., Seoul (KR)

(72) Inventor: Mi Kyung Park, Seoul (KR)

(73) Assignee: FORCS CO., LTD., Seoul (KR)

( * ) Notice: Subject to any disclaimer, the term of this patent is extended or adjusted under 35 U.S.C. 154(b) by 23 days.

(21) Appl. No.: 17/624,731

(22) PCT Filed: May 6, 2020

(86) PCT No.: PCT/KR2020/005954
§ 371 (c)(1),
(2) Date: Jan. 4, 2022

(87) PCT Pub. No.: WO2021/002585
PCT Pub. Date: Jan. 7, 2021

(65) Prior Publication Data
US 2022/0253596 A1 Aug. 11, 2022

(30) Foreign Application Priority Data
Jul. 4, 2019 (KR) .................. 10-2019-0080871

(51) Int. Cl.
*G06F 40/174* (2020.01)
*G06F 40/186* (2020.01)
(Continued)

(52) U.S. Cl.
CPC .......... *G06F 40/174* (2020.01); *G06F 40/186* (2020.01); *H04L 51/02* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 2011/0078778 A1* | 3/2011 | Gabriel | ................. | H04L 63/083 726/7 |
| 2012/0116972 A1* | 5/2012 | Walker | ............... | G06Q 20/0425 705/44 |

(Continued)

FOREIGN PATENT DOCUMENTS

| | | |
|---|---|---|
| JP | 2019028983 | 2/2019 |
| KR | 20110125908 | 11/2011 |

(Continued)

OTHER PUBLICATIONS

International Search Report—PCT/KR2020/005954 dated Aug. 20, 2020.

*Primary Examiner* — Mustafa A Amin
(74) *Attorney, Agent, or Firm* — CANTOR COLBURN LLP

(57) ABSTRACT

Provided are a method for providing an electronic document using a chatbot and a method and apparatus for writing an electronic document using a chatbot. The electronic document providing method using a chatbot includes receiving a chatting input associated with an electronic document from a user terminal, generating an electronic document based on the chatting input, and providing the generated electronic document to the user terminal.

11 Claims, 11 Drawing Sheets

(51) Int. Cl.
*G06Q 10/10* (2023.01)
*H04L 51/02* (2022.01)

(56) References Cited

U.S. PATENT DOCUMENTS

| | | | | |
|---|---|---|---|---|
| 2017/0148011 A1* | 5/2017 | Killoran, Jr. | ....... | G06Q 20/3255 |
| 2019/0394150 A1* | 12/2019 | Denoue | ................ | G06Q 10/101 |
| 2020/0242642 A1* | 7/2020 | Thimsen | ............ | G06Q 30/0203 |

FOREIGN PATENT DOCUMENTS

| KR | 101149695 | 5/2012 |
|---|---|---|
| KR | 20160120905 | 10/2016 |
| KR | 101705228 | 2/2017 |
| KR | 20170039881 | 4/2017 |
| KR | 20180086110 | 7/2018 |

* cited by examiner

| Authorization | Team Leader | Head of Department | Executive | CEO |
|---|---|---|---|---|
| | *Click to Sign* | *Click to Sign* | *Click to Sign* | *Click to Sign* |
| | | | | |

Request for Vacation

Requestor: Lee OO
Position: Researcher
Department: Research Center

1. Date and time

| 2018-05-04 | 09:00 | From |
|---|---|---|
| 2018-05-04 | 13:00 | To    ( 0.5 Days) |

2. Classification (Paid Time Off)   Family Event   Military Service   Others

3. Reason for Request          *Indicate detailed schedule if public holiday is included in requested vacation days.

Relaxation

Please review and approve the following request to use vacation.

Date :   2018 - 05 - 03

Signature of Requestor : _____

FIG. 4

METHOD FOR PROVIDING ELECTRIC DOCUMENT USING CHATBOT, APPARATUS AND METHOD FOR WRITING ELECTRIC DOCUMENT USING CHATBOT

BACKGROUND

Field

The present disclosure relates to a method for providing an electronic document using a chatbot, a method and an apparatus for writing an electronic document using a chatbot.

Description of the Related Art

In general, various types of documents are generated in the business area and the documents were written in a printed form in the related art, but recently, electronic documents and electronic signature services which generate various documents in the electronic form have been introduced to be utilized. The electronic documents and electronic signature services show a rapid growing trend in accordance with a paperless policy of the government.

Further, in accordance with the popularization of smart devices, user's experiences using various messengers, chatting, SNS, or chatbot-based services have been consistently accumulated. Currently, most of the chatbot-based services provide functions associated with the daily life and are expected to expand to the business area of the companies in the future.

Accordingly, necessities of the development of a technique and a system of generating an electronic document based on various types of input such as chatting input using a chatbot or text input or a technique and a system for controlling and managing electronic documents based on chatting input are increasing.

A related art of the present disclosure is disclosed in Korean Registered Patent Publication No. 10-1705228.

SUMMARY

The present disclosure has been made an effort to solve the above-described problems of the related art and an object thereof is to provide a method for providing an electronic document using a chatbot and a method and an apparatus for writing an electronic document using a chatbot which are associated with various services such as messengers, chatting, and SNS to exchange information by chatting or conversation with a user and write or process the electronic document.

However, objects to be achieved by various embodiments of the present disclosure are not limited to the technical objects as described above and other technical objects may be present.

As a technical means to achieve the above-described technical object, according to an aspect of the present disclosure, an electronic document providing method using a chatbot may include receiving a chatting input associated with an electronic document from a user terminal; generating an electronic document based on the chatting input; and providing the generated electronic document to the user terminal.

According to another aspect of the present disclosure, an electronic document writing method using a chatbot may include displaying a writing start chatting input in a chatting area by receiving the writing start chatting input associated with a type of an electronic form template to be written by a user of the user terminal, from the user terminal; determining an electronic form template to be written by the user based on the writing start chatting input and calling the electronic form template; displaying a question text to induce a response of the user including content data to be input in at least one entry field in the chatting area based on at least one entry field in the electronic form template; displaying the response chatting input in the chatting area by receiving the response chatting input of the user including a response to the question text; and writing an electronic document by entering the content data corresponding to the entry field based on the response chatting input.

Further, in the writing of the electronic document, the response chatting input is analyzed in the unit of key and value to enter the content data corresponding to the entry field in the electronic document.

Further, the electronic document may be generated based on a conversation including at least one question text and a response chatting input corresponding thereto and may not be displayed on the user terminal.

According to another aspect of the present disclosure, an electronic document writing method using a chatbot may include displaying a chatting input associated with a modification in the chatting area by receiving the chatting input associated with the modification of the previously input content data of the electronic document from the user terminal; analyzing the chatting input associated with the modification in the unit of key and value; and substituting content data previously input in the electronic document entry field associated with the key with content data associated with the value based on an analysis result.

According to the exemplary embodiment of the present disclosure, the electronic document writing method using a chatbot may further include storing the electronic document when the writing of the content data for all the entry fields included in the electronic document template is completed to finish the writing of the electronic document.

Further, the storing of the electronic document may include displaying a text requesting an autograph of a writer of the electronic document which is completely written in a chatting area; displaying an autograph input window; receiving the autograph by means of a typing input unit in the autograph input window from the writer; and storing an electronic document including the autograph information.

Further, in the receiving of the autograph, at least one of typing speed information and typing pressure information of the writer is sensed to receive the sensing result and the autograph together.

According to the exemplary embodiment of the present disclosure, the electronic document writing method using a chatbot may further include, after the storing of the electronic document, displaying a text guiding writing completion of the electronic document in the chatting area; and displaying information about the completed electronic document in the chatting area when a chatting input associated with a confirmation request of the completed electronic document is input from the user terminal.

Further, in the displaying of information about the completed electronic document, an URL associated with the completed electronic document may be displayed in the chatting area.

According to the exemplary embodiment of the present disclosure, the electronic document writing method using a chatbot may further include receiving a chatting input associated with registration of a boilerplate from the user terminal to display the chatting input in the chatting area;

storing the boilerplate and a character string corresponding to the boilerplate as a pair based on a chatting input associated with the registration of the boilerplate; and displaying a text guiding the storage result in the chatting area.

Further, in the writing of the electronic document, when there is a previously stored boilerplate in the response chatting input, the content data may be entered in the entry field based on the character string.

According to another aspect of the present disclosure, an electronic document writing apparatus using a chatbot may include a chatting input receiving unit which receives a writing start chatting input associated with a type of an electronic form template to be written by a user of a user terminal and a response chatting input of the user including a response to a question text, from the user terminal; a template determining unit configured to determine an electronic form template to be written by the user based on the writing start chatting input and call the electronic form template; a question generating unit configured to display a question text to induce a response of the user including content data to be input in an entry field based on the entry field in the electronic form template in a chatting area of the user terminal; and an electronic document writing unit configured to write an electronic document by entering the content data corresponding to the entry field based on the response chatting input.

The above-described solving means are merely illustrative but should not be construed as limiting the present disclosure. In addition to the above-described embodiments, additional embodiments may be further provided in the drawings and the detailed description of the present disclosure.

According to the above-described object of the present disclosure, it is possible to provide a method for providing an electronic document using a chatbot and a method and an apparatus for writing an electronic document using a chatbot which are associated with various services such as messengers, chatting, and SNS to exchange information by chatting or conversation with a user and write or process the electronic document.

According to the above-described object of the present disclosure, a user of a user terminal who writes the electronic document may complete the electronic document by performing the conversation through a chatting using a device associated with a messenger or SNS without opening the electronic document so that the electronic document may be written or provided based on natural conversation which does not give the feeling of writing the electronic document.

However, the effect which can be achieved by the present disclosure is not limited to the above-described effects, there may be other effects.

BRIEF DESCRIPTION OF THE DRAWINGS

The above and other aspects, features and other advantages of the present disclosure will be more clearly understood from the following detailed description taken in conjunction with the accompanying drawings, in which:

FIG. 3 is a view illustrating an electronic document written by an electronic document writing apparatus using a chatbot according to an exemplary embodiment of the present disclosure;

FIG. 4 is a view illustrating a process of modifying previously input content data using a chatbot according to an exemplary embodiment of the present disclosure;

DETAILED DESCRIPTION OF THE EMBODIMENT

Figure 1:
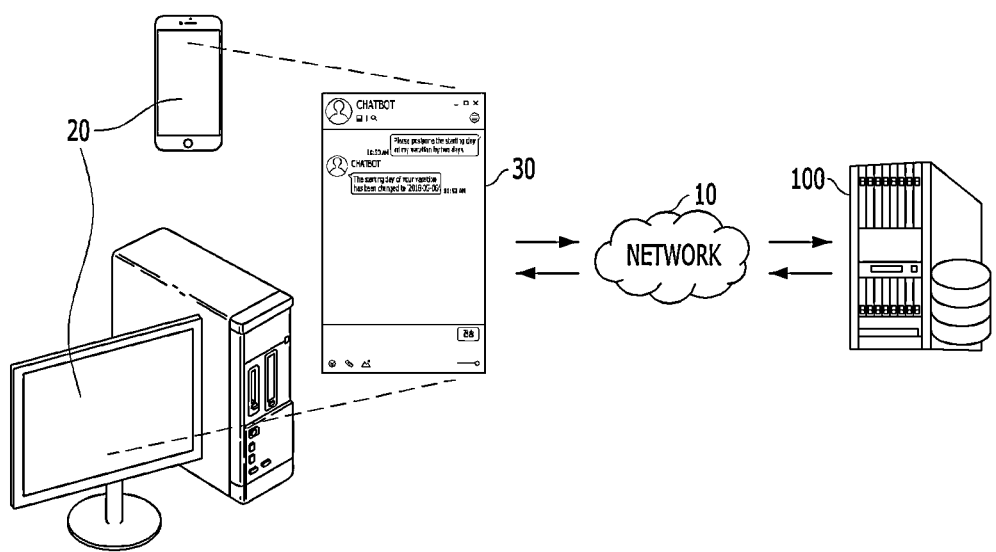
FIG. 1 is a schematic diagram of an electronic document providing system using a chatbot including an electronic document writing apparatus using a chatbot according to an exemplary embodiment of the present disclosure.

Hereinafter, the present disclosure will be described more fully with reference to the accompanying drawings, in which exemplary embodiments of the present disclosure are shown. However, the present disclosure can be realized in various different forms, and is not limited to the embodiments described herein. Accordingly, in order to clearly explain the present disclosure in the drawings, portions not related to the description are omitted. Like reference numerals designate like elements throughout the specification.

Throughout this specification and the claims that follow, when it is described that an element is "coupled" to another element, the element may be "directly coupled" to the other element or "electrically coupled" or "indirectly coupled" to the other element through a third element.

Through the specification of the present disclosure, when one member is located "on", "above", "on an upper portion", "below", "under", and "on a lower portion" of the other member, the member may be adjacent to the other member or a third member may be disposed between the above two members.

In the specification of the present disclosure, unless explicitly described to the contrary, the word "comprise" and variations such as "comprises" or "comprising", will be understood to imply the inclusion of stated elements but not the exclusion of any other elements.

FIG. 1 is a schematic diagram of an electronic document providing system using a chatbot including an electronic document writing apparatus using a chatbot according to an exemplary embodiment of the present disclosure.

Referring to FIG. 1, an electronic document providing system using a chatbot according to an exemplary embodiment of the present disclosure may include an electronic document writing apparatus using a chatbot according to an exemplary embodiment of the present disclosure (hereinafter, referred to as "electronic document writing apparatus 100"), a network 10, and a user terminal 20.

For example, the user terminal 20 may include all kinds of wired/wireless communication devices such as a smart phone, a smart pad, a tablet PC, a personal communication system (PCS), a global system for mobile communication (GSM), a personal digital cellular (PDC), a personal handyphone system (PHS), a personal digital assistant (PDA), an international mobile telecommunication (IMT)-2000, code division multiple access (CDMA)-2000, W-code division multiple access (W-CDMA), and a wireless broadband internet (Wibro) terminal.

Specifically, the user terminal 20 may include various audio systems and driving devices using various communication techniques which are newly emerging, such as a smart speaker, a smart car, smart appliances, wearable devices, and augmented reality devices (VR/MR).

Further, the user terminal 20 is associated with a messenger application installed in the user terminal 20 to display a chatting input associated with the electronic document and a text associated with the electronic document writing in a chatting area 30 formed in the messenger application.

The user terminal 20 and the electronic document writing apparatus 100 may communicate with each other via a network 10 connected thereto.

The user terminal 20 may include an application unit which is interlinked with the electronic document writing apparatus 100 using a chatbot to transmit a user input input from the user to the electronic document writing apparatus 100 using a chatbot or receive a processing result for the user input.

According to the exemplary embodiment of the present disclosure, the application unit may include a virtual artificial intelligence assistant application. For example, the virtual artificial intelligence assistant application may include a virtual artificial intelligence assistant service such as SIRI, GOOGLE ASSISTANT, ALEXA, CORTANA, BIXBY, NUGU, or CLOVA, but is not limited thereto.

According to another exemplary embodiment of the present disclosure, the application unit may include a messenger application. For example, the messenger application may include a messenger service, such as KAKAO TALK, MY PEOPLE, LINE, TIKTOK, BUDDY-BUDDY, SAYCLUB, MSN MESSENGER, YAHOO MESSENGER, NATEON, DAUM WIZ GENIE, DAUM MESSENGER, KTIMAN MESSENGER, FACEBOOK, TELEGRAM, AND WHATSAPP, but is not limited thereto.

For example, the network 10 may include networks, such as a $3^{rd}$ generation partnership project (3GPP) network, a long term evolution (LTE) network, a 5G network, a world interoperability for microwave access (WiMAX) network, Internet, a local area network (LAN), a wireless local area network (wireless LAN), a wide area network (WAN), a personal area network (PAN), a Bluetooth network, a satellite broadcasting network, an analog broadcasting network and a digital multimedia broadcasting (DMB) network, but are not limited thereto.

The electronic document writing apparatus 100 may receive a chatting input associated with the electronic document from the user terminal 20.

Further, the electronic document writing apparatus 100 may generate an electronic document based on the chatting input.

Further, the electronic document apparatus 100 may provide the generated electronic document to the user terminal 20.

Figure 2:
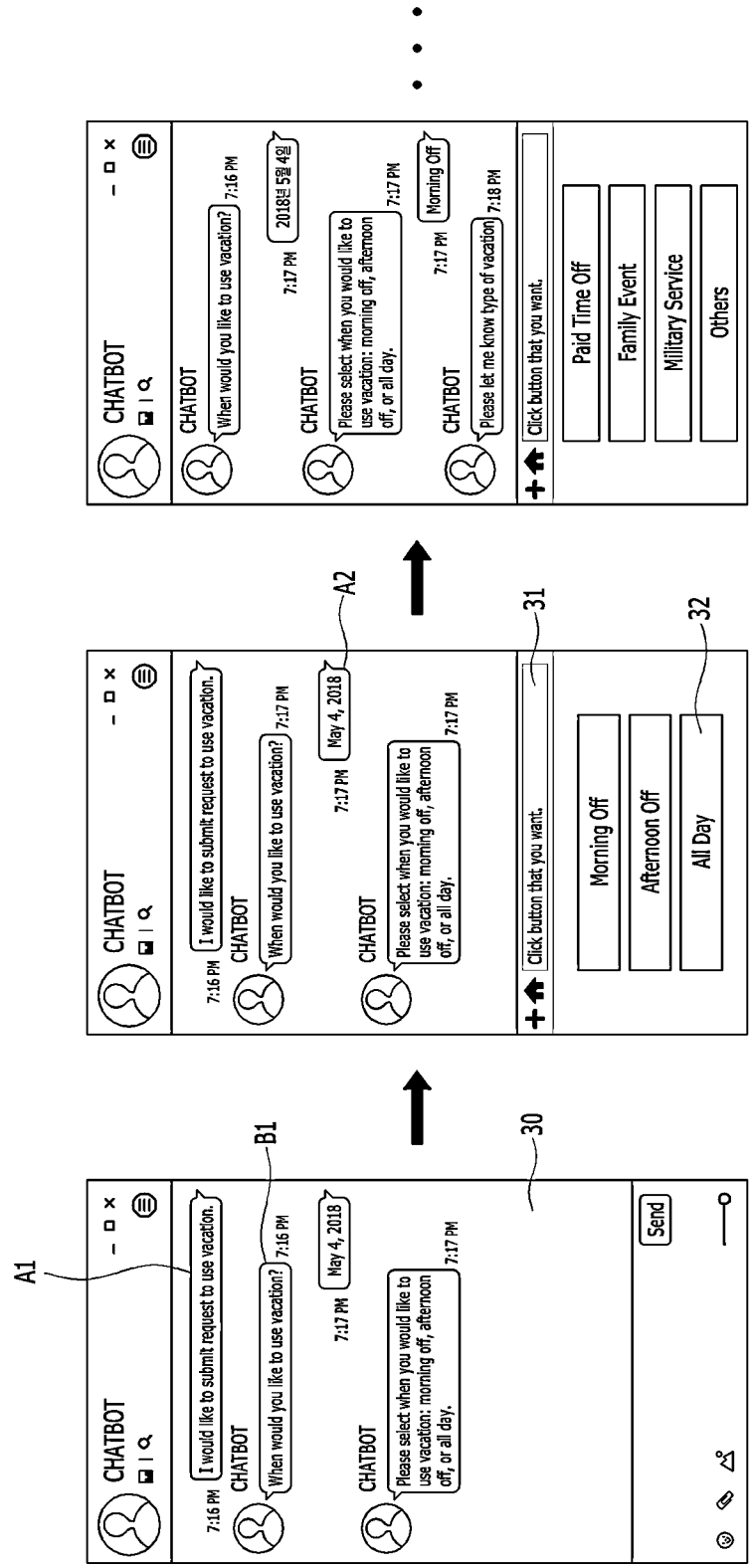
FIG. 2 is a view for explaining a process of writing an electronic document by an electronic document writing apparatus according to an exemplary embodiment of the present disclosure based on chatting input.

FIG. 2 is a view for explaining a process of writing an electronic document by an electronic document writing apparatus according to an exemplary embodiment of the present disclosure based on chatting input.

Referring to FIG. 2, the electronic document may be generated based on conversation including at least one question text B1 and a response chatting input A2 corresponding thereto.

Further, the electronic document may not be displayed on the user terminal 20. Specifically, when the electronic document is not displayed as described above, it may be understood that information associated with the electronic document which is being written during the process of writing the electronic document may be not visually displayed on the user terminal 20.

That is, a user of the user terminal 20 who inputs the chatting input for writing the electronic document to the chatting area may write the electronic document while having a natural conversation using the user terminal 20 without opening the electronic document and without feeling that the electronic document is being written. This is because the user terminal 20 transmits the chatting input of the user included in the conversation to the electronic document writing apparatus 100 and the electronic document writing apparatus 100 completes the electronic document based on the chatting input.

When the final conversation between the user of the user terminal 20 and the user terminal 20 ends, the electronic document may be completed by the electronic document writing apparatus 100. The completed electronic document may be provided using a messenger application installed in the user terminal 20, for example, upon the request of the user of the user terminal 20. As another example, the user may confirm the information about the completed electronic document using a voice from the user terminal 20 including a voice output function.

Referring to 2, only a process of performing the conversation between the user of the user terminal 20 and the user terminal 20 using the messenger application is illustrated, but the user's chatting input may be transmitted to the electronic document writing apparatus 100 from the user terminal 20 via the network 10. Similarly, when the electronic document writing apparatus 100 generates questions to induce the response of the user to write the electronic document and transmits the question to the user terminal 20, the user terminal 20 may output a question text.

The electronic document writing apparatus 100 may receive a writing start chatting input A1 associated with a type of an electronic document template to be written by the user of the user terminal 20 from the user terminal 20.

Referring to FIG. 2, the electronic document writing by the electronic document writing apparatus 100 according to the exemplary embodiment of the present disclosure may be started when the user of the user terminal 20 inputs the writing start chatting input A1 to the chatting area 30.

As another example, the electronic document writing by the electronic document writing apparatus 100 may be started when the user terminal 20 outputs a question text asking the user of the user terminal 20 a type of an electronic document template to be written and the user inputs the writing start chatting input A1 in response thereto.

Further, the electronic document writing apparatus 100 may determine the electronic document template to be written by the user based on the writing start chatting input A1 and call the electronic document template.

Referring to FIG. 2, the electronic document template determined by the writing start chatting input A1 may be "Request for vacation".

Even though it is not illustrated in FIG. 2, after the electronic document writing apparatus 100 analyzes the writing start chatting input A1 to determine the "Request for vacation" as the electronic document template to be written by the user, the electronic document writing apparatus 100 may call a previously stored "Request for vacation" form to be put in a standby state to write content data.

Further, the electronic document writing apparatus 100 may transmit a question text B1 to the user terminal 20 to induce the response of the user including content data to be input in an entry field based on the entry field in the electronic document template.

The electronic document writing apparatus 100 according to the exemplary embodiment of the present disclosure may generate a question associated with the electronic document entry field. Further, the question may include a first type question including intention data and a second type question which does not include the intention data. The intention data may be determined based on the form of the electronic document. The intention data may be understood as a concept corresponding to a key to be described below which is associated with an entry field which needs to be input by the user on the electronic document to complete one electronic document.

According to the exemplary embodiment of the present disclosure, the first type question may refer to a question directly including "vacation category" and "vacation reason" of the intention data according to the exemplary embodiment of the present disclosure in the question, such as "Let me know vacation category and vacation reason".

When there are many questions asking the user during the process of writing the electronic document, it may take a long time to complete the electronic document so that it is desirable for the electronic document writing apparatus 100 to generate a question which covers two or more entry fields, but is not limited thereto.

The user terminal 20 which receives the question text B1 including the question from the electronic document writing apparatus 100 may display the question text B1 in the chatting area 30 to allow the user to check it.

Next, the user who checks the question text B1 inputs a response chatting input A2 including a response to the question text B1 in the chatting area 30, the electronic document writing apparatus 100 may receive the response chatting input A2 from the user terminal 20.

Further, referring to FIG. 2, for example, the user of the user terminal 20 may write the writing start chatting input A1 or the response chatting input A2 in a text input window 31 provided in the chatting area 30.

As another example, the user of the user terminal 20 touches or clicks a text button 32 provided in the chatting area 30 to enter the writing start chatting input A1 or the response chatting input A2. At this time, the electronic document writing apparatus 200 may configure the number of text buttons 32 or contents thereof to vary depending on the entry fields of the electronic document which is currently being written.

Further, the electronic document writing apparatus 100 enters the content data corresponding to the entry field in the electronic document template based on the response chatting input A1 to write the electronic document.

According to the exemplary embodiment of the present disclosure, when the electronic document is written by entering the content data corresponding to the entry field based on the response chatting input A2, it means that the response chatting input A2 is analyzed in the unit of key and value to extract content data corresponding to the entry field and enter the content data in the electronic document.

According to the exemplary embodiment of the present disclosure, the Key may refer to intention data associated with the entry field to be input by the user on the electronic document to complete one electronic document. The intention data may be determined based on the form of the electronic document.

The intention data according to the exemplary embodiment of the present disclosure may include "(vacation) date (vacation start date and vacation end date), (vacation) classification, and (vacation) reason" which need to be input by the user to complete the vacation request.

The electronic document writing apparatus 100 according to the exemplary embodiment of the present disclosure extracts a part which has a similarity larger than or equal to the electronic document entry field from the response chatting input to acquire the key (intention data).

Further, according to an exemplary embodiment of the present disclosure, the electronic document writing apparatus 100 may utilize a Levenshtein distance algorithm to determine a point at which the intention data starts. A predicted position of the intention data is specified by the algorithm and an edit distance between the electronic document entry field and a portion which is estimated as the intention data is calculated by sequentially moving the predicted position one by one to determine a point at which the edit distance is minimum as a point that the intention data starts.

Further, according to the exemplary embodiment of the present disclosure, the electronic document writing apparatus 100 may extract source content data corresponding to the intention data. Specifically, the electronic document writing apparatus 100 may extract a portion before a starting point of the N+1-th intention data from an ending point of N-th intention data among the response chatting input as source content data corresponding to the N-th intention data.

Further, according to the exemplary embodiment of the present disclosure, it may be understood that the value refers to the source content data.

Further, according to the exemplary embodiment of the present disclosure, when the N-th intention data is the last intention data in the response chatting input, the electronic document writing apparatus 100 may extract the portion from the ending point of the N-th intention data to the last of the response chatting input as source content data corresponding to the N-th intention data.

The source content data may include a part of utterance which corresponds to the intention data and is not cleansed, together with the content data to be input for the electronic document entry field and is finally, processed as the content data by the electronic document writing apparatus 100 to be entered in the electronic document entry field.

Hereinafter, a process of processing the source content data to content data to be actually entered in the electronic document entry field by the electronic document writing apparatus 100 will be described in more detail.

Even though not illustrated in the drawings, for the purpose of processing to the content data, the electronic document writing apparatus 100 may include a postposition processing unit, a morpheme analyzing unit, and a form converting unit.

The postposition processing unit may process by determining whether a first segment of the source content data is a postposition. At this time, when the first segment of the source content data is a postposition, the postposition processing unit may delete the corresponding segment.

The morpheme analyzing unit may combine the remaining segments excluding the first segment. Further, the morpheme analyzing unit may perform the morpheme analysis on a last segment of the source content data which is primarily processed by the postposition processing unit. Further, the morpheme analyzing unit may detect the morpheme analysis result in a reverse direction to detect a full morpheme.

When the detected full morpheme is not a nominal form, the form converting unit may convert the detected full morpheme into a nominal form. For example, the form converting unit may perform the conversion into the nominal form by combining "-ness" or "-t(s)ion" after the full morpheme of a predicate (verb or adjective) form. According to the exemplary embodiment of the present disclosure, the form converting unit may convert the detected full morpheme in consideration of a type of the detected full morpheme. For example, when the detected full morpheme is a "text type", if the detected full morpheme is not a nominal form as described above, the detected full morpheme may be converted into a nominal form and as another example, if the detected full morpheme is a "date type", the detected full morpheme may be converted into a date form (for example, year-month-day). Specifically, when the detected full morpheme is "today", "today" is identified as a full morpheme to enter a date of the corresponding day. As another example, when the detected full morpheme is a "number type", number information itself may be entered without performing additional conversion.

Further, according to the exemplary embodiment of the present disclosure, when the format of the electronic document entry field is not appropriate to enter the detected full morpheme, such as a combo box, a check box, or a radio button, a combo box, a check box, or a radio button which is the most approximate to the contents included in the detected full morpheme may be selected based on the above-described Levenshtein distance algorithm.

According to the exemplary embodiment of the present disclosure, the source content data which has been completely converted by the form converting unit may be fixed as the content data to be finally entered in the electronic document.

Further, according to the exemplary embodiment of the present disclosure, when the question text is a first type question, the electronic document writing apparatus 100 may determine whether the content data corresponds to all the intention data included in the question text (in other words, all the Keys) and whether the content data is appropriately determined according to the intention data.

At this time, when the content data does not correspond to a part of the intention data included in the question, the electronic document writing apparatus 100 may regenerate a question text associated with the electronic document entry field based on missed intention data.

Further, according to the exemplary embodiment of the present disclosure, when the content data is not appropriately determined according to the intention data, the electronic document writing apparatus 100 may generate the question text associated with the intention data again.

Further, regardless of whether the type of the question is the first type question or the second type question, in consideration of the overall intention data which needs to be written to complete the electronic document, if intention data for which the corresponding content data has not been completely entered remains, the electronic document writing apparatus 100 may regenerate the question text associated with the electronic document entry field in consideration of the remaining intention data.

Further, each content data itself may be written according to the format of the electronic document. As another example, the data may be entered in the form of O/X to match the contents of the content data, entered by checking the letter V, or selecting a corresponding answer among answer types determined in advance for every entry field, but is not limited thereto.

FIG. 3 is a view illustrating an electronic document written by an electronic document writing apparatus using a chatbot according to an exemplary embodiment of the present disclosure.

Referring to FIG. 3, the electronic document writing apparatus 100 may write the electronic document 40 by entering the content data based on the chatting input based on the "Request for vacation" electronic document template to be written by the user. Further, referring to FIG. 3, the electronic document 40 generated by the electronic document writing apparatus 100 may not be visually displayed on the user terminal 20. That is, the electronic document 40 illustrated in FIG. 3 may represent that the electronic document is stored on the electronic document writing apparatus 100.

As another example, the electronic document 40 generated by the electronic document writing apparatus 100 may be implemented to be visually displayed on the user terminal 20 upon the request of the user of the user terminal 20.

Further, referring to FIG. 3, the electronic document writing apparatus 10 may analyze the writing start chatting input A1 to open the electronic document template (for example, "Request for vacation") to be written by the user and enter the content data "2018-05-04, 09:00 to 2018-05-04, 13:00" in the entry fields "vacation start date, vacation end date" in the electronic document template based on the response chatting input A2. Further, as the content data, "relaxation" may be input in the entry field "vacation reason" in the electronic document template.

Figure 4:
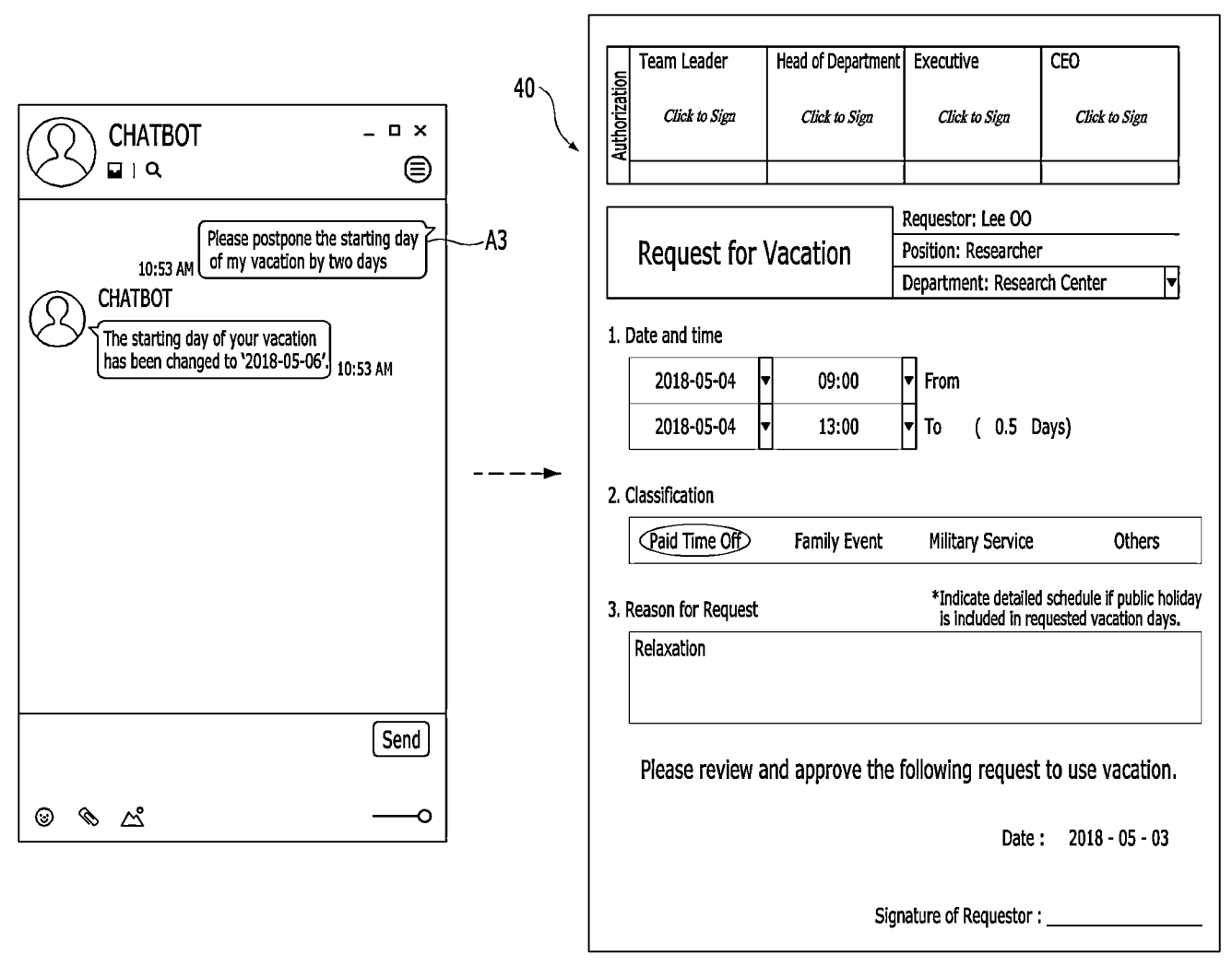

FIG. 4 is a view illustrating a process of modifying previously input content data using a chatbot according to an exemplary embodiment of the present disclosure.

Referring to FIG. 4, the electronic document writing apparatus 100 may receive a chatting input A3 associated with the modification of the previously input content data of the electronic document from the user terminal 20.

Further, the electronic document writing apparatus 100 may analyze the chatting input A3 associated with the modification in the unit of key and value.

Further, the electronic document writing apparatus 100 may substitute the content data which has been input in advance in the electronic document entry field associated with the key with content data associated with the value, based on the analysis result.

Referring to FIG. 4, when the chatting input A3 associated with the modification is "Postpone the starting day of vacation by two days", the electronic document writing apparatus 100 may extract a key "starting day of vacation" and a value "postpone by two days".

Next, the electronic document writing apparatus 100 may substitute "2018-05-04" which is content data input in advance in "vacation start day, vacation end day" which are electronic document entry fields associated with the key with "2018-05-06" which is content data associated with the value.

By doing this, referring to FIG. 4, the fields of "vacation start day, vacation end day" entered in the electronic document 40 which is completely modified may be changed to 2018-05-06 09:00 to 2018-05-06 13:00.

Further, referring to FIG. 4, the electronic document writing apparatus 100 may display a text informing that the modification of the electronic document 40 is completed according to the chatting input A3 associated with the modification of the user of the user terminal 20 in the chatting area 30.

When the writing of the content data for the entire entry fields included in the electronic document template is completed to finish the wilting of the electronic document, the electronic document writing apparatus 100 may store the completed electronic document.

Further, the electronic document apparatus 100 may acquire an autograph of a writer of the electronic document which is completely written from the user terminal 20.

Figure 5:
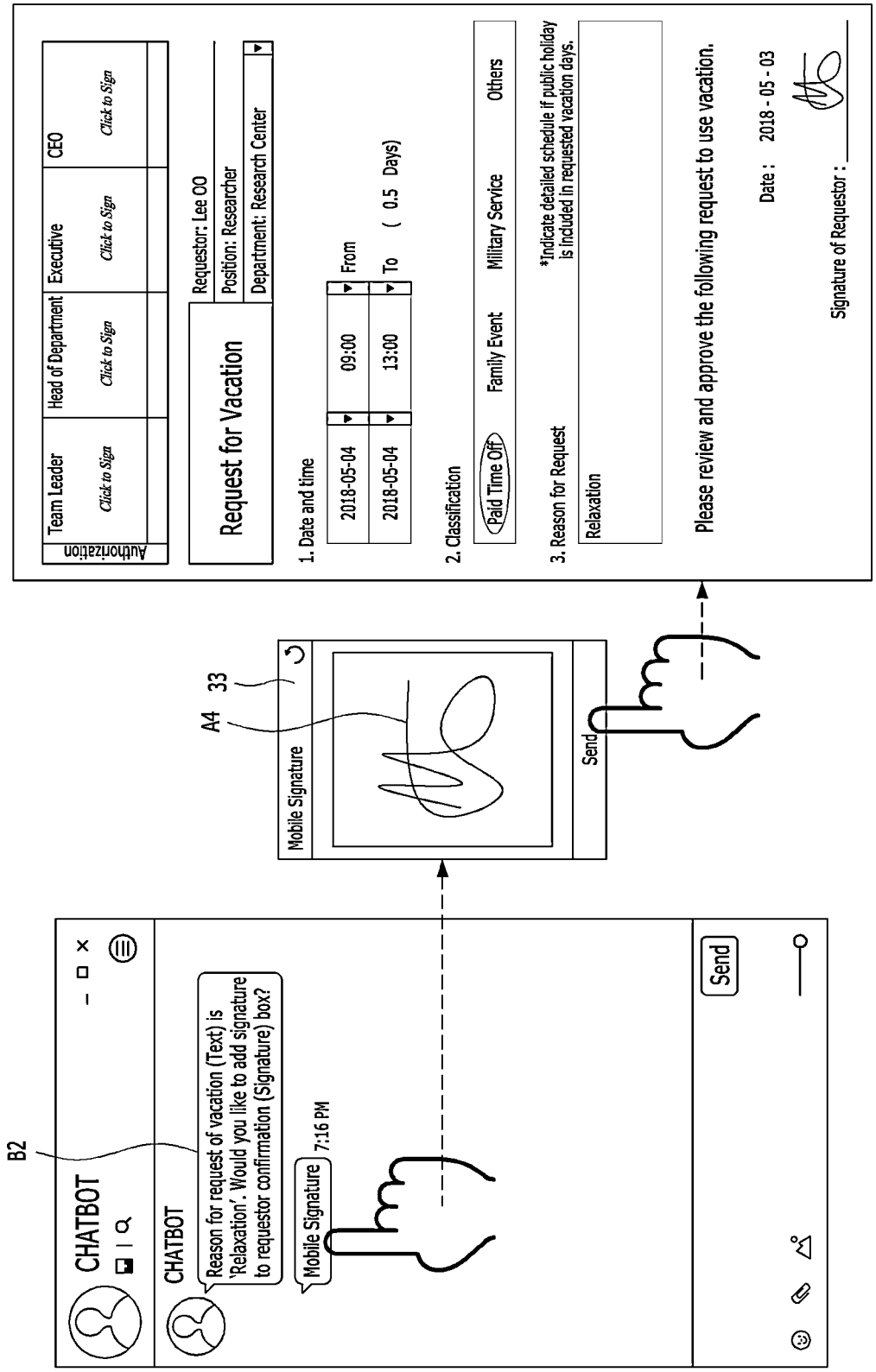
FIG. 5 is a view illustrating that an electronic document writing apparatus using a chatbot according to an exemplary embodiment of the present disclosure acquires an autograph of an electronic document writer from a user terminal.

FIG. 5 is a view illustrating that an electronic document writing apparatus using a chatbot according to an exemplary embodiment of the present disclosure acquires autograph of an electronic document writer from a user terminal.

Referring to FIG. 5, the electronic document writing apparatus 100 may display a text B2 requesting an autograph of a writer of the electronic document which is completely written, in the chatting area 30.

Further, according to the exemplary embodiment of the present disclosure, the electronic document writing apparatus 100 may display a link connected to the autograph input window in the chatting area 30. The writer of the electronic document touches (clicks) a partial area of the link to call the autograph input window.

Further, the electronic document writing apparatus 100 may display the autograph input window 33.

The electronic document writing apparatus 100 may receive the autograph A4 in the autograph input window 33 using a typing input unit from the writer.

Further, the electronic document writing apparatus 100 may store the electronic document including autograph information associated the autograph A4. The autograph information associated with the autograph A4 may include a result obtained by sensing at least one of typing speed information and typing pressure information.

According to the exemplary embodiment of the present disclosure, the electronic document writing apparatus 100 may sense at least one of the typing speed information and the typing pressure information of the writer to receive the sensing result and the autograph A4 together.

Figure 6A:
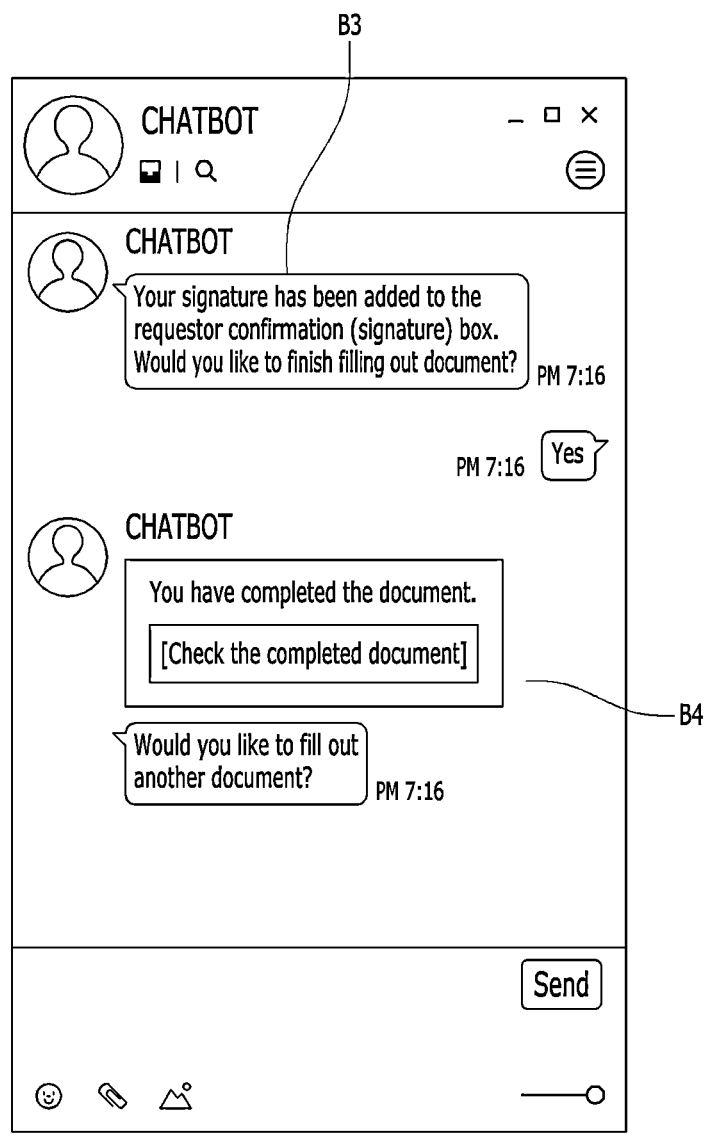
FIG. 6A is a view illustrating that an electronic document writing apparatus according to an exemplary embodiment of the present disclosure displays information about a completed electronic document on a user terminal.

FIG. 6A is a view illustrating that an electronic document writing apparatus according to an exemplary embodiment of the present disclosure displays information about a completed electronic document on a user terminal.

Referring to FIG. 6A, the electronic document writing apparatus 100 may display a text B3 informing that the writing of the electronic document is completed in the chatting area 30.

Further, according to the exemplary embodiment of the present disclosure, when the chatting input associated with the request for confirming the completed electronic document is input from the user terminal 20, the electronic document writing apparatus 100 may display the information about the completed electronic document in the chatting area 30.

Further, according to the exemplary embodiment of the present disclosure, the electronic document writing apparatus 100 may display an URL B4 associated with the completed electronic document in the chatting area 30 to display information about the completed electronic document. Further, referring to FIG. 6A, when the information about the completed electronic document is displayed in the above-described user terminal 20, it may be understood that the URL B4 associated with the completed electronic document is displayed in the user terminal 20. According to the exemplary embodiment of the present disclosure, the URL B4 associated with the completed electronic document may be provided in the chatting area 30 to have a button shape. When the user of the user terminal 20 touches or clicks the button shape, a web or a mobile page, or an application interface through which the completed electronic document is identified may be displayed in the user terminal 20.

Further, according to the exemplary embodiment of the present disclosure, the electronic document writing apparatus 100 may embody a processing result associated with the electronic document into a user interface (UI) and a user experience (UX) based on an attribute of the user terminal 20 to return to the user terminal 20.

According to the exemplary embodiment of the present disclosure, the above-described attribute of the user terminal 20 may include an input/output data type supported by the user terminal 20 and a size of a display screen of the user terminal 20.

For example, when a size of the display screen of the user terminal 20 is equal to or smaller than a predetermined size, the electronic document writing apparatus 100 may simply mark the processing result associated with the electronic document in consideration of an input order and the grouping of the entry fields of the electronic document. As another example, when the size of the display screen of the user terminal 20 is larger than a predetermined size, the electronic document writing apparatus 100 may represent the processing result associated with the electronic document by implementing the entire electronic document form by an interface.

Further, according to the exemplary embodiment of the present disclosure, the electronic document writing apparatus 100 may change UI and UX in consideration of a role in a task of the user of the user terminal 20 to embody the processing result associated with the electronic document in different ways.

For example, the electronic document writing apparatus 100 may differentiate the UI and UX provided to a first electronic document writer and a UI and a UX provided to an authority who is in a position to process to approve or reject the electronic document to transmit the processing result associated with the electronic document in different ways.

Figure 6B:
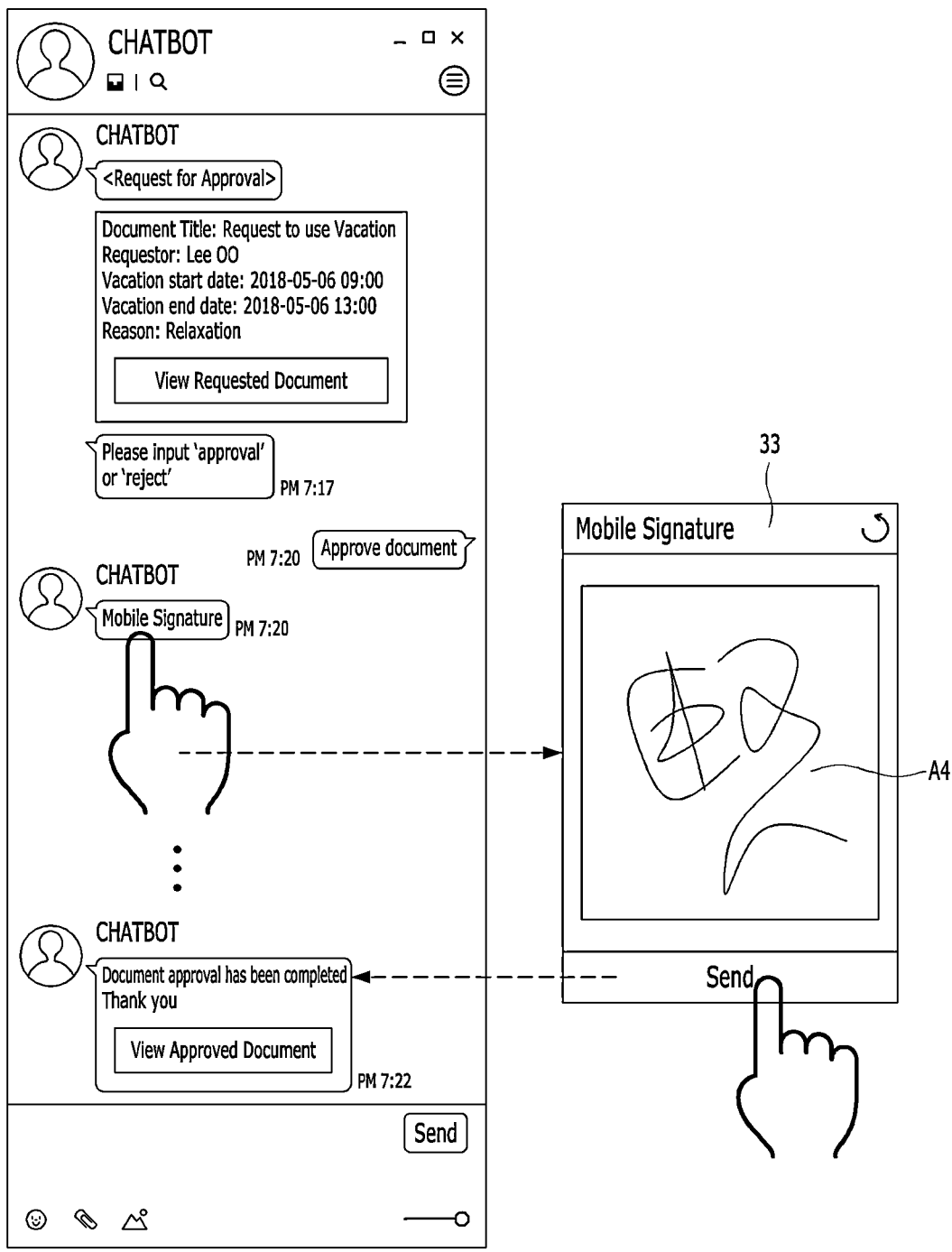
FIGS. 6B and 6C are views illustrating that an electronic document writing apparatus according to an exemplary embodiment of the present disclosure transmits information about a completed electronic document to a user terminal of an authority or a contractor who can handle the completed electronic document and requests the processing of the completed electronic document.
Figure 6C:
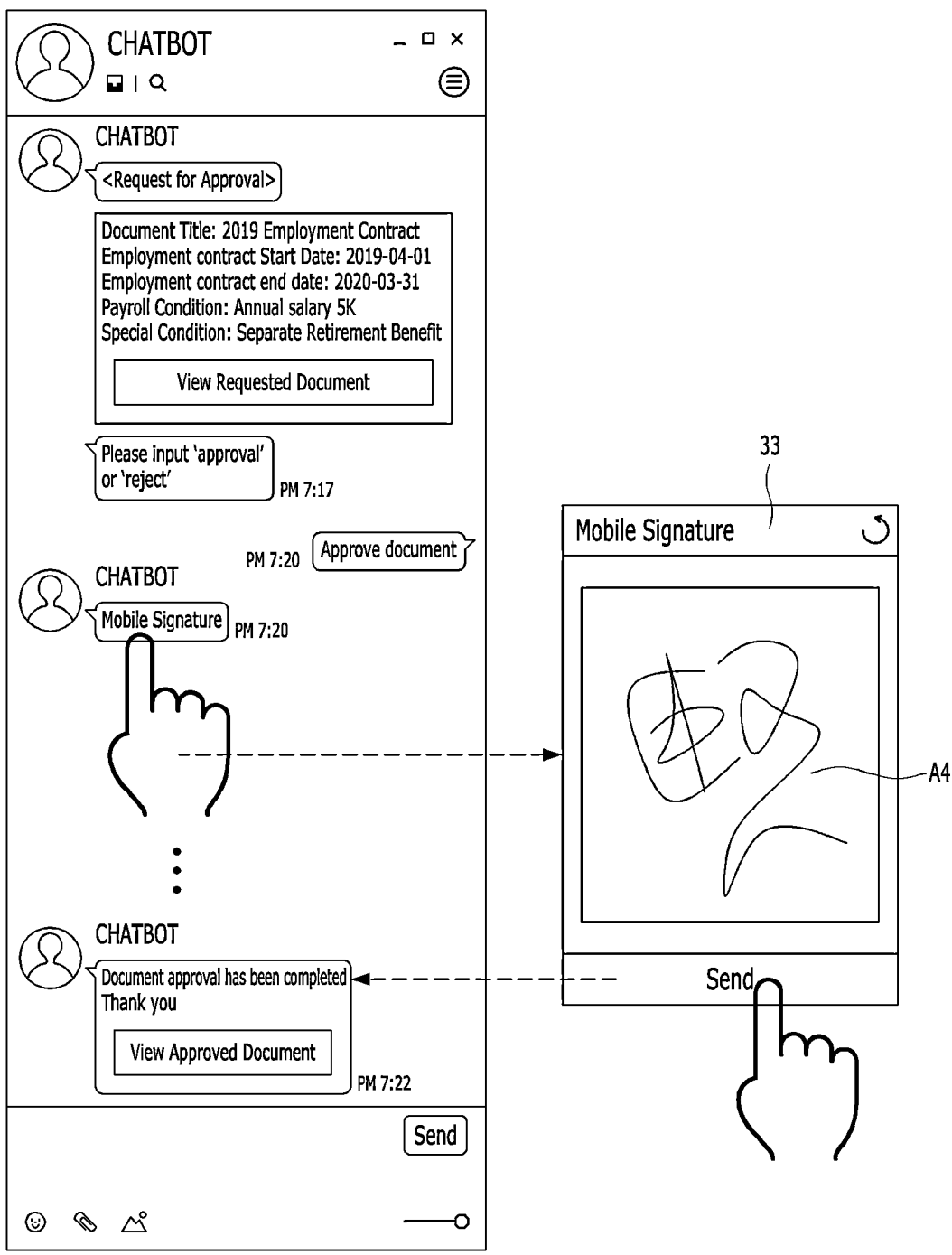

FIGS. 6B and 6C are views illustrating that an electronic document writing apparatus using a chatbot according to an exemplary embodiment of the present disclosure transmits information about a completed electronic document to a user terminal of an authority or a contractor who may handle the completed electronic document and requests for the processing of the completed electronic document. Specifically, FIG. 6B illustrates that information of the completed electronic document is transmitted to a user terminal of an authority in a position who may handle the completed electronic document such as "Request for vacation" and the processing of the completed electronic document is requested. FIG. 6C illustrates that information of the completed electronic document is transmitted to a user terminal of a contractor in a position who may handle the completed electronic document such as "Employment contract" and the processing of the completed electronic document is requested.

Referring to FIG. 6B, when the writing and storing of the electronic document such as a Request for vacation template are completed, the electronic document writing apparatus 100 may transmit the information of the completed electronic document to a user terminal (not illustrated) of an authority which may handle to approve or reject the electronic document and request for the processing of the completed electronic document.

Specifically, the information of the completed electronic document is provided as summary information in which main fields among the entry fields of the entire electronic document and data written in the main fields are summarized or a button shape to include at least one of a web or mobile page through which the completed electronic document is confirmed and an URL connected to the application interface.

According to the exemplary embodiment of the present disclosure, when the authority of the electronic document inputs a chatting input ("approve it" in FIG. 6B) indicating to approve the electronic document using the user terminal (not illustrated) of the authority, the electronic document writing apparatus 100 may display a link connected to the autograph input window 33 to acquire the autograph information of the authority. Next, when the authority of the electronic document inputs the autograph A4 through the autograph input window 33, the electronic document writing apparatus 100 may store the electronic document including the autograph A4 and complete the approval processing of the electronic document.

FIG. 6C is a view illustrating that when the writing and storing of the electronic document such as an Employment contract template are completed, the electronic document writing apparatus 100 may transmit the information of the completed electronic document to a user terminal (not illustrated) of an authority who may handle to approve or reject the electronic document and request for the processing of the completed electronic document. The entire flows of transmitting information associated with the completed electronic document, requesting the authority to process the electronic document, and acquiring the autograph of the authority are the same as those of FIG. 6B.

Further, the electronic document writing apparatus 100 may receive the chatting input associated with registration of a boilerplate from the user terminal 20 to display it in the chatting area 30.

Further, the electronic document writing apparatus 100 may store a boilerplate and a character string corresponding to the boilerplate as a pair based on the chatting input associated with the registration of the boilerplate.

Further, when there is a previously stored boilerplate in the response chatting input A2, the electronic document writing apparatus 100 may enter the content data in the entry field in the electronic document based on the character string corresponding to the boilerplate.

For example, when it is identified that "my office address" which is a previously stored boilerplate is included in the response chatting input A2, the electronic document writing apparatus 100 may enter the character string "FORCS building, 646, Nonhyeon-ro, Gangnam-gu, Seoul" corresponding to the boilerplate "my office address" in the "address" entry field in the electronic document.

Specifically, in order to identify whether the previously stored boilerplate is included in the response chatting input A2, the electronic document writing apparatus 100 may identify a phrase which refers to the user itself of the user terminal 20 such as "my". When it is identified that the phrase referring to the user itself and a key such as an "office address" are simultaneously input, the electronic document writing apparatus 100 may enter the character string "FORCS building, 646, Nonhyeon-ro, Gangnam-gu, Seoul" corresponding to the boilerplate "my office address" in the "address" entry field in the electronic document 40.

That is, when the phrase "office address" is simply included in the response chatting input A2, if all the phrase is substituted with the character string corresponding to the boilerplate to be entered in the electronic document, there may be an overfitting problem in that even in the case in which "office address" needs to be input as it is, the phrase is substituted with the character string corresponding to the boilerplate. Therefore, in order to solve this problem, the electronic document writing apparatus 100 may be implemented to substitute the phrase with the character string only when the phrase input to refer to the user itself (in other words, a value recognizing the user, "my") and the boilerplate ("office address") value are simultaneously included in the response chatting input A2.

Figure 7:
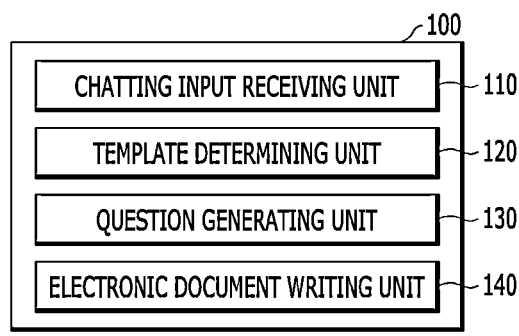
FIG. 7 is a schematic diagram of an electronic document writing apparatus using a chatbot according to an exemplary embodiment of the present disclosure.

FIG. 7 is a schematic diagram of an electronic document writing apparatus using a chatbot according to an exemplary embodiment of the present disclosure.

Referring to FIG. 7, the electronic document writing apparatus 100 may include a chatting input receiving unit 110, a template determining unit 120, a question generating unit 130, and an electronic document writing unit 140.

The chatting input receiving unit 110 may receive a writing start chatting input A1 associated with a type of an electronic document template to be written by a user of the user terminal 20 and a response chatting input A2 including a response for a question text from the user terminal 20.

Further, the template determining unit 120 may determine the electronic document template to be written by the user based on the writing start chatting input A1 and call the electronic document template.

The question generating unit 130 may transmit a question text B1 to the user terminal 20 to induce the response of the user including content data to be input in an entry field based on the entry field in the electronic document template.

The electronic document writing unit 140 may enter the content data corresponding to the entry field based on the response chatting input A2 to create the electronic document.

Even though it is not illustrated in the drawings, the electronic document providing system 1 using a chatbot according to an exemplary embodiment of the present disclosure may include not only the electronic document writing apparatus 100 using a chatbot, but also a natural language processing-based electronic document control apparatus which identifies an intention of a user by receiving a user input from the user terminal 20 and performing the natural language processing on the user input and determines a control operation which conforms to the user's intention to approve, register, or delete the previously written electronic document or provide an electronic document list conforming to a search condition included in the user input, or control the movement between the plurality of electronic documents.

Further, according to the exemplary embodiment of the present disclosure, the natural language processing-based electronic document control apparatus may include a natural language processor which identifies an intention of the user by means of the natural language processing on the user input, an electronic document processor which approves, registers, or deletes the previously written electronic document according to the intention of the user, an electronic document search unit which provides an electronic document list conforming to the search condition included in the user input according to the intention of the user, and a navigation module which controls the movement between the plurality of electronic documents according to the intention of the user.

Further, according to the exemplary embodiment of the present disclosure, the natural language processor may include a pattern generating unit which acquires a concept included in the plurality of sentences by means of morpheme analysis on a plurality of sentences including similar intentions to create a pattern character string and generate a pattern based on the pattern character string and a user input analysis unit which receives the user input to return matching data by matching the pattern corresponding to the user input.

Further, according to the exemplary embodiment of the present disclosure, the pattern generating unit may include a morpheme analysis unit which performs morpheme analysis on each of the plurality of sentences, a concept acquiring unit which acquires a concept based on a morpheme analysis result, a pattern character string creating unit which creates a pattern character string including at least one of a capture to extract a specific phrase from the user input and the concept, and a pattern defining unit which defines a pattern based on the pattern character string.

According to the exemplary embodiment of the present disclosure, the user input analysis unit may include a segmentation unit which divides the user input into a plurality of segments by cutting the user input in the unit of space and a matching unit which determines whether at least one segment and the pattern match to return the matching data when the matching is successful.

In summary, the natural language processing unit may match all the natural languages including derived words by analyzing a plurality of sentences containing a similar intention by introducing morpheme analysis to extract roots and reflecting it in the patterns. Further, the natural language processing unit may identify the intention of the user who generates the user input based on the pattern.

Further, according to the exemplary embodiment of the present disclosure, the natural language processing-based electronic document control apparatus may include an electronic document writing unit which writes or modifies the electronic document based on an electronic document template, according to the intention of the user. According to the exemplary embodiment, the electronic document writing unit may be understood to refer to a configuration which is the same as or integrally implemented with the electronic document writing unit 140 of the electronic document writing apparatus 100 using a chatbot according to the exemplary embodiment of the present disclosure.

Further, even though it is not illustrated in the drawings, the electronic document providing system 1 using a chatbot according to the exemplary embodiment of the present disclosure may include an electronic document storage apparatus associated with the electronic document.

According to the exemplary embodiment of the present disclosure, the electronic document storage apparatus may include a template database which stores a plurality of forms according to a type of the electronic document.

Further, according to the exemplary embodiment of the present disclosure, electronic document templates for every type of the plurality of electronic documents stored in the template database may be added, modified, or deleted upon the request of the user to update the template database.

According to the exemplary embodiment of the present disclosure, the electronic document storage apparatus may include an electronic document database which makes a list of the electronic documents which are completely written by the electronic document writing apparatus 100 to store the list.

According to the exemplary embodiment of the present disclosure, the electronic document storage apparatus may include a stage database which stores a stage which is dynamically generated according to a type of the electronic document template and defines a query associated with the electronic document control and a predicted uttering intention of the user for the query.

Further, the electronic document providing system 1 using a chatbot according to an exemplary embodiment of the present disclosure may include an account interlinkage apparatus which interlinks an account of the user terminal 20 and an account of the electronic document providing system 1 using a chatbot or the electronic document writing apparatus 100 using a chatbot to assign an access right.

Further, according to the exemplary embodiment of the present disclosure, the account interlinkage apparatus may interlink an account of the application unit and the account of the electronic document providing system 1 using a chatbot or the electronic document writing apparatus 100 using a chatbot to assign an access right.

Further, the electronic document providing system 1 using a chatbot according to the exemplary embodiment of the present disclosure may include a device-associated framework device which standardizes the user input to a format processible by the electronic document writing apparatus 100 or the natural language processing-based electronic document control apparatus and converts a processing result of the electronic document writing apparatus 100 or the natural language processing-based electronic document control apparatus into a format processible by the user terminal 20 to return.

According to the exemplary embodiment of the present disclosure, the device-associated framework device may be implemented by a direct callable framework, a synchronous framework, or an asynchronous framework.

The direct callable framework is a standardized input in which the user input is directly processed by the electronic document writing apparatus 100 or the natural language processing-based electronic document control apparatus. When the electronic document writing apparatus 100 or the natural language processing-based electronic document control apparatus returns a standardized output that can be processed by the user terminal 20, a connection interface may be provided.

When the user input is generated in the form of an external platform, the synchronous framework may convert a processing result of the electronic document writing apparatus 100 or the natural language processing-based electronic document control apparatus into a response to a request generated in the external platform to return.

The asynchronous framework may first return whether the user input has been successfully received in response to the user input, and convert the processing result of the electronic document writing apparatus 100 or the natural language processing-based electronic document control apparatus to call the application programming interface (API) for each external platform to return.

Further, the electronic document providing system 1 using a chatbot according to the exemplary embodiment of the present disclosure may include a cognitive service-associated framework device to process a user input generated to have a type other than the chatting input.

The cognitive service-associated framework device may extract contents of the user input using a cognitive API (application programming interface) corresponding to a type of the user input generated to have a type other than the chatting input and convert and transmit the extracted content of the user input into a format processable by the electronic document writing apparatus 100 or the natural language processing-based electronic document control apparatus.

Figure 8:
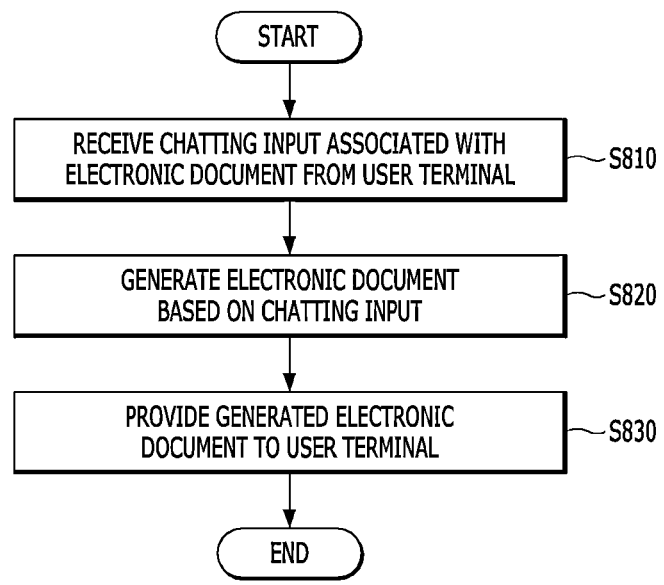
FIG. 8 is an operation flowchart of an electronic document providing method using a chatbot according to an exemplary embodiment of the present disclosure.

FIG. 8 is an operation flowchart of an electronic document providing method using a chatbot according to an exemplary embodiment of the present disclosure.

The electronic document providing method using a chatbot illustrated in FIG. 8 may be performed by the above-described electronic document writing apparatus 100 using a chatbot or the electronic document providing system using a chatbot including the same. Accordingly, even though some contents are omitted below, the contents which have been described for the electronic document writing apparatus 100 using a chatbot or the electronic document providing system using a chatbot including the same may be applied to FIG. 8 in the same way.

Referring to FIG. 8, in step S810, the electronic document writing apparatus 100 may receive a chatting input associated with the electronic document from the user terminal 20.

Further, according to the exemplary embodiment of the present disclosure, in step S810, the chatting input receiving unit 110 may receive a writing start chatting input A1 associated with a type of an electronic document template to be written by a user of the user terminal 20 from the user terminal 20 and a response chatting input A2 including a response to a question text B1 from the user terminal 20.

Next, in step S820, the electronic document writing apparatus 100 may generate an electronic document based on the chatting input received in step S810.

Next, in step S830, the electronic document writing apparatus 100 may provide the electronic document generated in step S820 to the user terminal 20.

In the above description, steps S810 to S830 may be further divided into additional steps or combined as smaller steps depending on an implementation example of the present disclosure. Further, some steps may be omitted if necessary and the order of steps may be changed.

Figure 9:
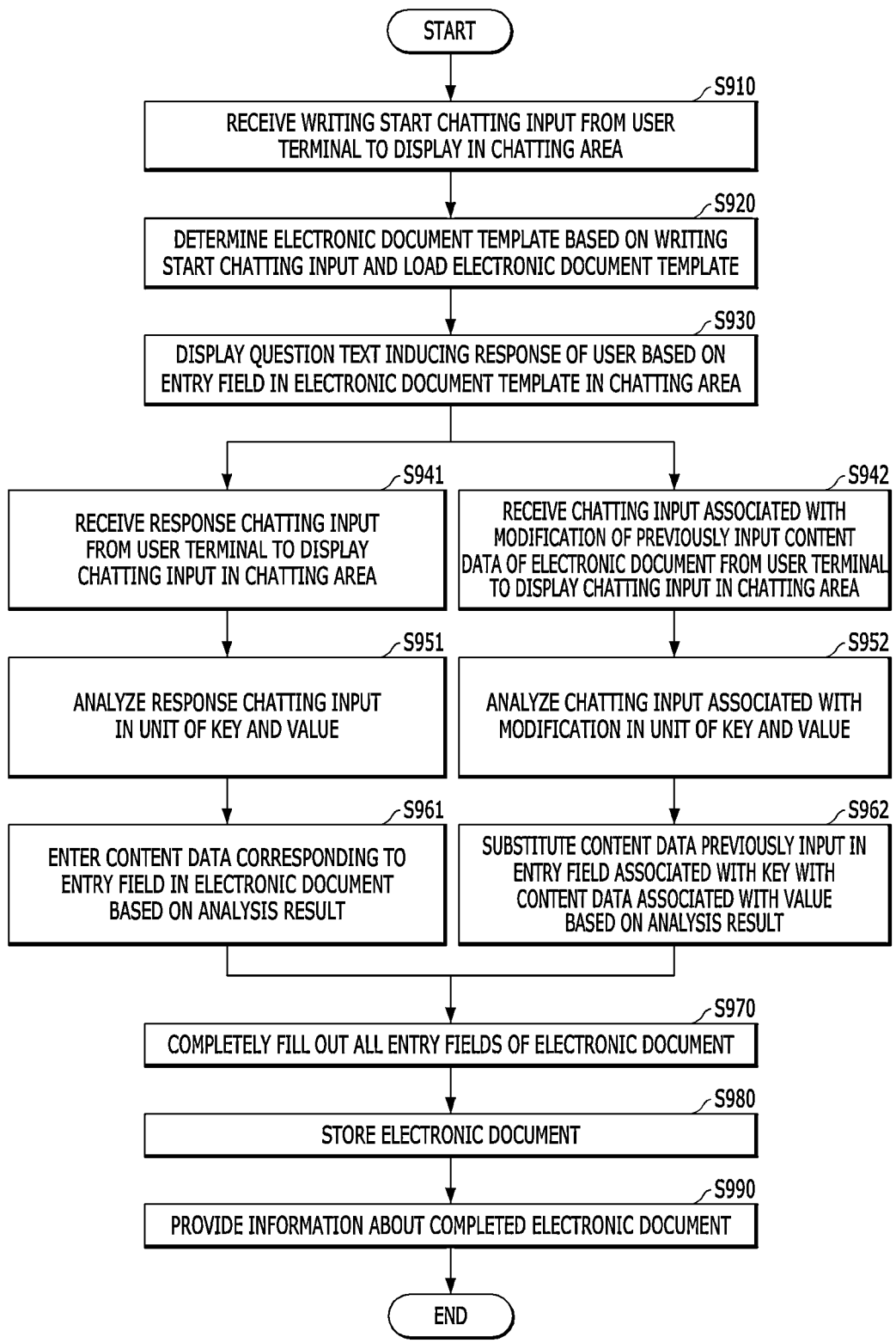
FIG. 9 is an operation flowchart of an electronic document writing method using a chatbot according to an exemplary embodiment of the present disclosure.

FIG. 9 is an operation flowchart of an electronic document writing method using a chatbot according to an exemplary embodiment of the present disclosure.

The electronic document writing method using a chatbot illustrated in FIG. 9 may be performed by the above-described electronic document writing apparatus 100 using a chatbot or the electronic document providing system using a chatbot including the same. Accordingly, even though some contents are omitted below, the contents which have been described for the electronic document writing apparatus 100 using a chatbot or the electronic document providing system using a chatbot including the same may be applied to FIG. 9 in the same way.

Referring to FIG. 9, in step S910, the chatting input receiving unit 110 may receive a writing start chatting input A1 associated with a type of an electronic document template to be written by the user of the user terminal 20 from the user terminal 20.

Next, in step S910, the template determining unit 120 may determine the electronic document template to be written by the user based on the writing start chatting input A1 and call the electronic document template.

Next, in step S930, the question generating unit 130 may transmit a question text B1 to the user terminal 20 to induce the response of the user including content data to be input in an entry field based on the entry field in the electronic document template.

Next, in step S941, the chatting input receiving unit 110 may receive the response chatting input A2 including a response to the question text B1 from the user terminal 20.

Further, in step S942, the chatting input receiving unit 110 may receive the chatting input A3 associated with the modification of the previously input content data of the electronic document from the user terminal 20.

Next, in step S951, when the response chatting input A2 is received in step S941, the electronic document writing unit 140 may analyze the response chatting input A2 in the unit of key and value.

Further, in step S952, when the chatting input A3 associated with the modification is received in step S942, the electronic document writing unit 140 may analyze the chatting input A3 associated with the modification in the unit of key and value.

Next, in step S961, the electronic document writing unit 140 may enter the content data corresponding to the entry field in the electronic document based on the analysis result of step S951.

Further, in step S962, the electronic document writing unit 140 may substitute the content data which has been input in advance in the electronic document entry field associated with the key with content data associated with the value based on the analysis result of step S952.

Next, in step S970, the electronic document writing unit 140 may complete the writing of the content data for the entire entry fields included in the electronic document template as results of entering the content data by steps S941, S951, and S961 and modifying the content data by steps S942, S952, and S962.

Next, in step S980, the electronic document writing unit 140 may store the electronic document which is completely written.

Next, in step S990, the electronic document writing apparatus 100 may provide information about the completed electronic document to the user terminal 20.

In the above description, steps S910 to S990 may be further divided into additional steps or combined as smaller steps depending on an implementation example of the present disclosure. Further, some steps may be omitted if necessary and the order of steps may be changed.

Figure 10:
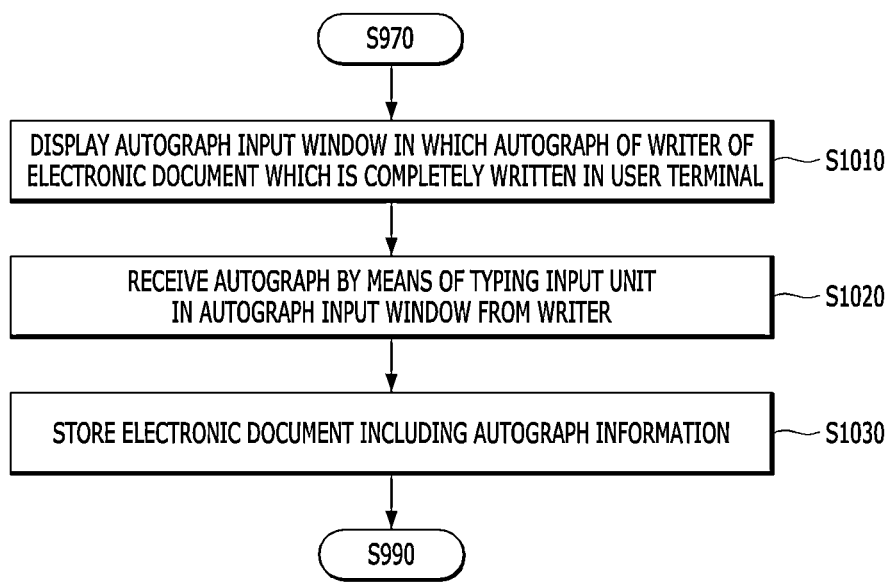
FIG. 10 is an operation flowchart of a method of storing an electronic document including autograph information of an electronic document writer according to an exemplary embodiment of the present disclosure.

FIG. 10 is an operation flowchart of a method of storing an electronic document including autograph information of an electronic document writer according to an exemplary embodiment of the present disclosure.

The method of storing an electronic document including autograph information of an electronic document writer illustrated in FIG. 10 may be performed by the above-described electronic document writing apparatus 100 using a chatbot or the electronic document providing system using a chatbot including the same. Accordingly, even though some contents are omitted below, the contents which have been described for the electronic document writing apparatus 100 using a chatbot or the electronic document providing system using a chatbot including the same may be applied to FIG. 10 in the same way.

Referring to FIG. 10, in step S1010, the electronic document writing unit 140 may display an autograph input window 33 in which an autograph of a writer of the electronic document which is completely written is input in the user terminal 20.

Further, in step S1010, the electronic document writing unit 140 may display a text requesting an autograph of the writer of the electronic document which is completely written in the chatting area 30 before displaying the autograph input window or simultaneously with displaying the autograph input window 33.

Next, in step S1020, the electronic document writing unit 140 may receive the autograph A4 in the autograph input window 33 using a typing input unit from the writer of the electronic document.

Further, in step S1020, the electronic document writing unit 140 may sense at least one of the typing speed information and the typing pressure information of the writer of the electronic document to receive the sensing result and the autograph A4 together.

Next, in step S1030, the electronic document writing unit 140 may store the electronic document including the autograph information.

In the above description, steps S1010 to S1030 may be further divided into additional steps or combined as smaller steps depending on an implementation example of the present disclosure. Further, some steps may be omitted if necessary and the order of steps may be changed.

The electronic document providing method using a chatbot or the electronic document writing method using a chatbot according to the exemplary embodiment of the present invention may be implemented as a program command which may be executed by various computers to be recorded in a computer readable medium. The computer readable medium may include solely a program command, a data file, and a data structure or a combination thereof. The program command recorded in the medium may be specifically designed or constructed for the present disclosure or known to those skilled in the art of a computer software to be used. An example of the computer readable recording medium includes magnetic media, such as a hard disk, a floppy disk, and a magnetic tape, optical media, such as a CD-ROM and a DVD, magneto-optical media, such as a floptical disk, and a hardware device, such as a ROM, a RAM, a flash memory, specially formed to store and execute a program command. Examples of the program command include not only a machine language code which is created by a compiler but also a high level language code which may be executed by a computer using an interpreter. The hardware device may operate as one or more software modules in order to perform the operation of the present disclosure and vice versa.

Further, the electronic document providing method using a chatbot or the electronic document writing method using a chatbot described above may be implemented as a computer program or an application which is executed by a computer and stored in a recording medium.

The above description of the present disclosure is illustrative only and it is understood by those skilled in the art that the present disclosure may be easily modified to another specific type without changing the technical spirit of an essential feature of the present disclosure. Thus, it is to be appreciated that the embodiments described above are intended to be illustrative in every sense, and not restrictive. For example, each component which is described as a singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. An electronic document providing method using a chatbot, comprising:
   providing an electronic document writing apparatus comprising: a chatting input receiving unit, a template determining unit, a question generation unit and an electronic document writing unit, wherein the electronic document writing apparatus is connected with a user terminal through a communication network;
   receiving, by the chatting input receiving unit, a chatting input associated with an electronic document from the user terminal;
   determining, by the template determining unit, an electronic document template based on the chatting input;
   generating, by the question generating unit, a question text and transmitting the question text to the user terminal, wherein the user terminal generates a response chatting input in response to the question text;
   receiving, by the chatting input receiving unit, the response chatting input from the user terminal, wherein the response chatting input includes content data to be input in an entry field of the electronic document template;
   analyzing, by the electronic document writing unit, the response chatting input in a unit of a key and a value corresponding to the entry field in the electronic document template, and entering the content data into the entry field of the electronic document template based on a result of the analyzing to generate an electronic document, wherein the analyzing by the electronic document writing unit comprises acquiring the key by:
       extracting a part from the response chatting input based on a similarity between the part and the entry field; and
       determining, utilizing a distance algorithm, a start point associated with the key; and
   providing the generated electronic document to the user terminal,
   wherein the question text includes a first type question directly including the key or a second type question not including the key,
   wherein, when the question text includes the first type question, the analyzing comprises:
   determining whether the content data corresponds to the key included in the question text and whether the content data is appropriately determined according to the key; and
   regenerating the question text associated with the entry field based on a missed key.

2. The electronic document providing method using a chatbot according to claim 1, further comprising:
   generating, by the question generating unit, a modified question text and transmitting the modified question text to the user terminal, wherein the user terminal generates a modified response chatting input in response to the modified question text;
   receiving, by the chatting input receiving unit, the modified response chatting input from the user terminal;
   analyzing, by the electronic document writing unit, the modified response chatting input to generate a modified electronic document; and
   providing the modified electronic document to the user terminal.

3. The electronic document providing method using a chatbot according to claim 1, wherein the question text and the response chatting input are displayed on a chatbot of the user terminal, or
wherein the question text and the response chatting input are not displayed on a chatbot of the user terminal, and the electronic document is generated based on a conversation between the user terminal and a user of the user terminal, the conversation corresponding the question text and the response chatting input including the question text and the response chatting input.

4. The electronic document providing method using a chatbot according to claim 2, wherein the modified question text and the modified response chatting input are displayed on a chatbot of the user terminal,
wherein the modified response chatting input includes modified content data, and
wherein the content data is substituted with the modified content data.

5. The electronic document providing method using a chatbot according to claim 1, further comprising:
storing the electronic document.

6. The electronic document providing method using a chatbot according to claim 1, further comprising:
displaying a text requesting an autograph of a writer of the electronic document;
displaying an autograph input window;
receiving the autograph; and
storing the electronic document including the autograph.

7. The electronic document providing method using a chatbot according to claim 6, wherein the autograph includes at least one of autograph typing speed information and autograph typing pressure information of the writer.

8. The electronic document providing method using a chatbot according to claim 6, further comprising:
after the storing of the electronic document,
displaying a text guiding writing completion of the electronic document in the chatbot; and
displaying information about the electronic document in the chatbot when a chatting input associated with a confirmation request of the electronic document is input from the user terminal.

9. The electronic document providing method using a chatbot according to claim 8, wherein the information about the electronic document includes an URL associated with the electronic document.

10. The electronic document providing method using a chatbot according to claim 1, further comprising:
receiving a chatting input associated with registration of a boilerplate from the user terminal to display the chatting input in the chatbot;
storing the boilerplate and a character string corresponding to the boilerplate as a pair based on the chatting input associated with the registration of the boilerplate; and
displaying a text for guiding a result of the storing in the chatbot,
wherein the content data is entered in the entry field of the electronic document template, based on the character string of the boilerplate.

11. An electronic document writing apparatus using a chatbot, comprising:
a chatting input receiving unit configured to receive a chatting input associated with an electronic document from a user terminal;
a template determining unit configured to determine an electronic document template based on the chatting input;
a question generating unit configured to generate a question text and transmitting the question text to the user terminal, wherein the user terminal generates a response chatting input in response to the question text, wherein the chatting input receiving unit is further configured to receive the response chatting input from the user terminal, wherein the response chatting input includes content data to be input in an entry field of the electronic document template; and
an electronic document writing unit configured to analyze the response chatting input in a unit of a key and a value corresponding to the entry field in the electronic document template, and entering the content data into the entry field of the electronic document template based on a result of the analyzing to generate an electronic document, wherein the electronic document writing unit is configured to acquire the key by:
extracting a part from the response chatting input based on a similarity between the part and the entry field; and
determining, utilizing a distance algorithm, a start point associated with the key,
wherein the question generating unit is further configured to generate a modified question text and transmitting the modified question text to the user terminal, wherein the user terminal generates a modified response chatting input in response to the modified question text;
the chatting input receiving unit is further configured to receive the modified response chatting input from the user terminal; and
the electronic document writing unit is further configured to analyze the modified response chatting input to generate a modified electronic document, and
wherein the electronic document writing apparatus is connected with the user terminal through a communication network,
wherein the question text includes a first type question directly including the key or a second type question not including the key,
wherein, when the question text includes the first type question, the question generating unit is further configured: to determine whether the content data corresponds to the key included in the question text and whether the content data is appropriately determined according to the key; and to regenerate the question text associated with the entry field based on a missed key.

* * * * *